UNITED STATES PATENT OFFICE.

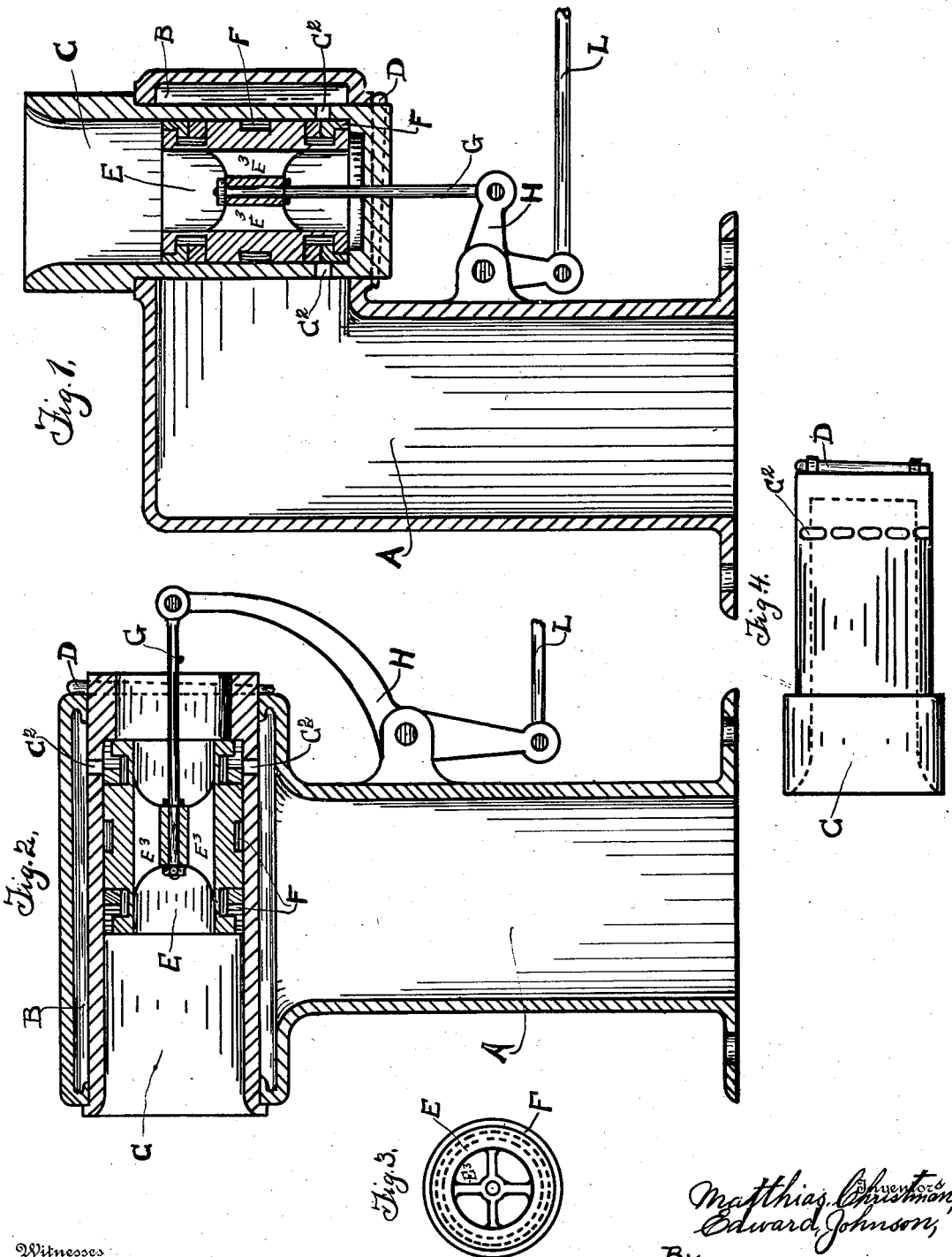

MATTHIAS CHRISTMAN AND EDWARD JOHNSON, OF SPRINGFIELD, MISSOURI.

PISTON THROTTLE-VALVE.

No. 860,190.          Specification of Letters Patent.          Patented July 16, 1907.

Application filed January 8, 1907. Serial No. 351,379.

*To all whom it may concern:*

Be it known that we, MATTHIAS CHRISTMAN and EDWARD JOHNSON, citizens of the United States, residing at Springfield, in the county of Greene and State of Missouri, have invented new and useful Improvements in Throttling-Valves, of which the following is a specification.

Our invention relates to improvements in a throttling valve for throttling or conveying the steam from the boiler into the steam chest of the engine the object of which is to provide a valve that will be steam tight, durable and easily gaged with reference to the quantity of steam transmitted.

These objects we attain by means of the device illustrated in the accompanying drawings forming a part of this specification in which Figure 1, is a sectional view showing the entire device. Fig. 2, is a similar view showing the valve operated on a horizontal. Fig. 3, is an end view showing the valve removed with its packing rings. Fig. 4, shows the bushing and the vents or ports in the same.

Similar letters indicate corresponding parts in the several figures.

A, is the ordinary stand pipe having a throttle box B, at the upper end, through which the steam passes to the dry pipe for the cylinders. The throttle box B, provided with bushing C said bushing is provided with ports $C^2$, for permitting the steam to pass from the boiler into the throttle box. The lower end of said bushing is provided with tapered bolts D for holding the bushing firmly in position and when the valve works on a horizontal said bushing C is provided with similar tapered bolts D to hold the same in position.

E, is a valve which fits closely in the bushing C and is provided with two or more packing rings F, for making a steam tight joint between the valve E and the bushing C. As the valve is moved in one direction upward. Said valve is made circular to fit the bushing C and also is provided with radial braces or spokes $E^3$, and made hollow so as to equalize the pressure of steam to prevent holding the same open by steam pressure. In the perpendicular position the ports $C^2$ are opened and the steam permitted to pass from the boiler into the stand pipe and by operating the piston rod G, upward when the valve works in a perpendicular position and drawing the piston rod down the ports $C^2$ are closed. Said piston rod is hinged to one end of the crank H and to the other end of said crank is hinged the throttle rod L. As the throttle lever is moved back and forth by its connections it operates the valve E, back and forth to open and close the ports $C^2$, in the bushing C, and thus supplies and cuts off the steam which passes unto the cylinder or steam chest by means of the spring packing rings F, on the valve E, the steam is prevented from escaping when the valve is closed and thus prevents accidents by steam escaping through the valve to the cylinders as the valve now in use which frequently causes serious accidents all of which are impossible by the valve constructed and operated as our invention above described.

Having thus described our invention what we claim as new and desire to secure by Letters Patent of the United States is:

In combination with a stand pipe for conducting steam to the cylinder of a locomotive a round bushing provided with ports tapering bolts for holding the same firmly in position to prevent the escape of steam, a hollow circular valve for equalizing the pressure of the steam and spring packing rings for preventing the escape of steam substantially as shown and described.

In testimony whereof we affix our signatures, in presence of two subscribing witnesses.

MATTHIAS CHRISTMAN.
         EDWARD JOHNSON.

Witnesses:
    S. A. HASELTINE,
    W. H. KREIDER.